United States Patent [19]

Johnson

[11] Patent Number: 4,896,629
[45] Date of Patent: Jan. 30, 1990

[54] POULTRY WATERING VALVE

[75] Inventor: Dwight N. Johnson, Carlsbad, Calif.

[73] Assignee: Aqua Drop Corporation, Carlsbad, Calif.

[21] Appl. No.: 238,538

[22] Filed: Aug. 30, 1988

[51] Int. Cl.$^4$ .............................................. A01K 7/06
[52] U.S. Cl. ................................. 119/72.5; 137/448; 251/120; 251/298; 251/339
[58] Field of Search ....................... 119/53.5, 54, 72.5, 119/75; 251/120, 298, 299, 339; 137/448

[56] References Cited

U.S. PATENT DOCUMENTS

| | | | |
|---|---|---|---|
| 3,582,006 | 6/1971 | Thompson | 119/72.5 |
| 4,258,666 | 3/1981 | Edstrom | 119/72.5 |
| 4,284,036 | 8/1981 | Hostetler | 119/72.5 |
| 4,338,884 | 7/1982 | Atchley et al. | 119/72.5 |
| 4,406,253 | 9/1983 | Atchley et al. | 119/72.5 |
| 4,573,433 | 3/1986 | Thompson | 119/72.5 |
| 4,586,464 | 5/1986 | Agerley et al. | 119/72.5 |
| 4,633,816 | 1/1987 | Ove et al. | 119/72.5 |
| 4,779,571 | 10/1988 | Row | 119/75 |
| 4,790,264 | 12/1988 | Lack et al. | 119/72.5 |

FOREIGN PATENT DOCUMENTS 6714547  6/1968  Netherlands .

Primary Examiner—Paul J. Hirsch
Attorney, Agent, or Firm—Mason, Kolehmainen, Rathburn & Wyss

[57] ABSTRACT

A poultry watering valve includes a housing including a body and cap defining a recess with a valve seat at its upstream end. A unitary seal member in the chamber includes a valve member portion urged by a spring against the downstream side of the valve seat. The seal member also includes a restrictor pin extending in an inlet bore upstream from the valve seat and a shank carring an operating stem extending through the valve outlet. The cap may be detached from the body for access to the seal member and spring without removing the body from the water supply conduit.

22 Claims, 2 Drawing Sheets

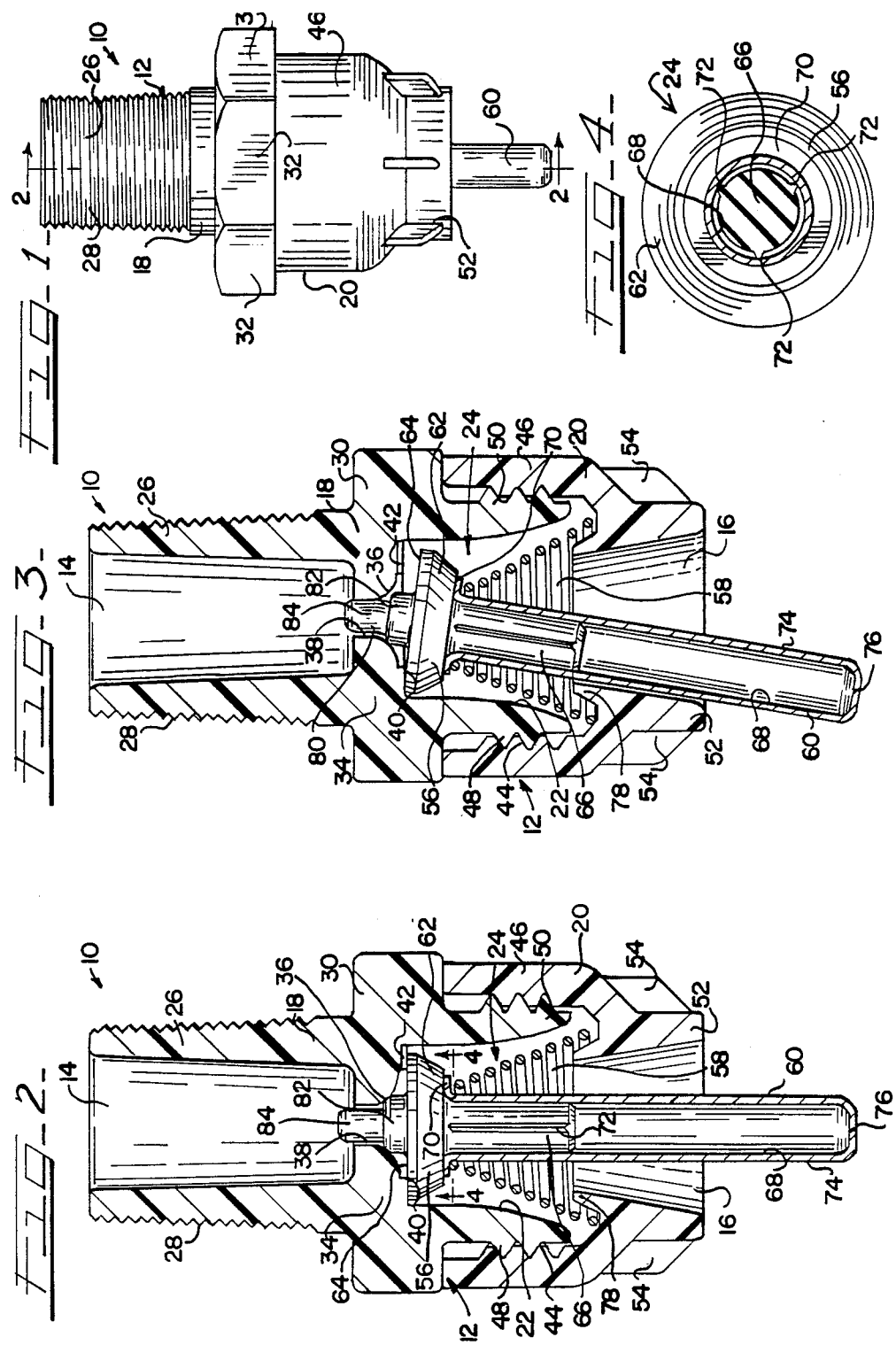

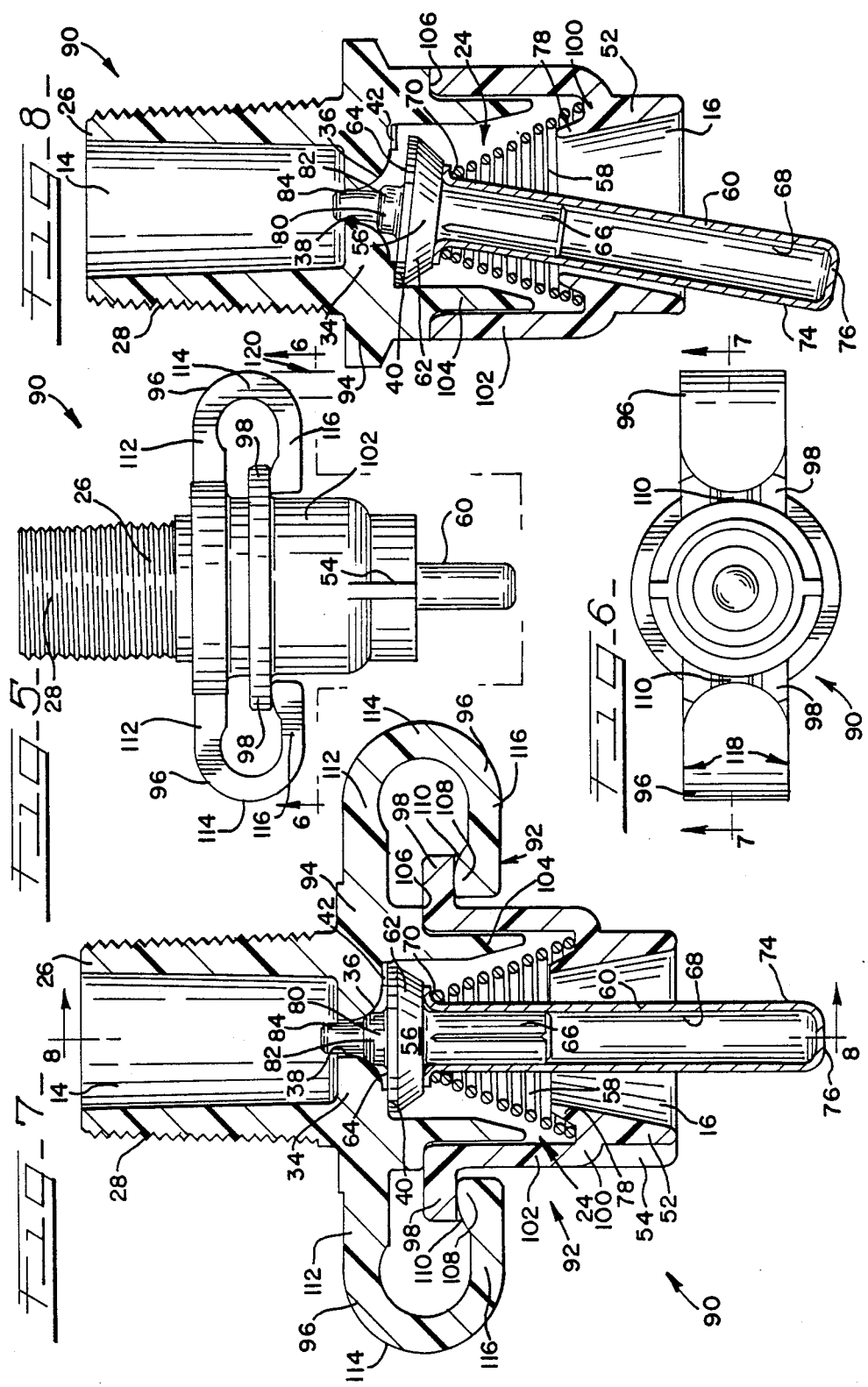

4,896,629

POULTRY WATERING VALVE

FIELD OF THE INVENTION

The present invention relates to valves and more particularly to improvements in poultry watering valves.

DESCRIPTION OF THE PRIOR ART

Many poultry operations use pressurized, on demand water systems including poultry watering valves actuated by birds for drinking water. Cup systems include a valve operated by a trigger within a drinking cup, and normally operate in a pressure range of four to ten pounds per square inch. Overhead nipple systems typically operate in a lower pressure range of from one-half to three pounds per square inch and use nipple valves with a trigger or stem that can be contacted by a drinking bird.

Poultry watering valves presently in use are specific to either cup systems or nipple systems. Birds learning to drink with one type of system can have difficulties when moved to the other type. This can be a disadvantage, for example, to concerns starting chicks on nipple systems and supplying them to egg laying operations using cup systems.

Many known poultry watering valves cannot attain a gradual modulation in drinking water flow in response to incremental valve stem or trigger movement. Valves which tend to alternate between open and closed positions can cause splashing and other problems. In addition, many known valves rely on water pressure to maintain the valve in a normally closed position. Operation is dependent upon water pressure and is inconsistent in different installations or in different locations in a single system.

Known poultry watering valves include a complex arrangement of valve members, stems, triggers, springs and seals in a housing that must be removed with tools from a water line for cleaning or replacement. The operation of such a valve can degrade if the valve is not periodically removed and cleaned, resulting in inconsistent operation, failure to fully close or the like.

U.S. Pat. No. 4,284,036 discloses a watering valve with a spring and valve member engageable with an upstream side of a valve seat in which water pressure urges the valve toward a closed position. The valve requires a special fitting for connection to a water line, and includes interfitting plastic tubular housing members held together with an interengaging hook system.

Netherlands patent specification No. 6714547 discloses a valve with a spring loaded valve member engageable with the downstream side of a valve seat. The assembly includes numerous parts and requires tools for disassembly and cleaning.

SUMMARY OF THE INVENTION

A principal object of the invention is to provide an improved and simplified poultry watering valve adaptable to both cup and nipple systems. Other objects are to provide a valve having a minimum of parts; to provide a valve that is self-cleaning in operation and capable of easily being disassembled for repair or replacement; to provide a valve that can be disassembled without removal of the valve body from a water supply line; to provide a valve that can be installed without tools; to provide a valve that is easy for a bird to learn and operate and which achieves gradual, regulated flow in dependence upon stem movement; and to provide a valve overcoming disadvantages experienced with poultry watering valves used in the past.

In brief, the above and other objects and advantages of the present invention are achieved by providing a poultry watering valve including a housing with a flow path extending between an inlet and an outlet. A valve seat surrounds the flow path and an inlet bore extends upstream from the valve seat toward the inlet. A valve member is engageable with the valve seat to control flow, and biasing means urges the valve member toward a closed position in engagement with the valve seat. A valve stem moves the valve member away from the valve seat toward an open position. The valve member is defined on an elastomeric seal member captured in the housing between the valve seat and the outlet. The seal member includes a restrictor pin portion extending upstream from the valve member through the inlet bore.

In accordance with an additional feature of the invention, the stem extends through the outlet port with radial clearance to permit the valve member to be tilted to an open position, and sufficient axial clearance is provided in the housing to permit the valve member and restrictor pin to move clear of the valve seat and inlet bore for flush cleaning. Another feature of one embodiment of the invention is the use of flexible and resilient snap arms for holding a housing body and cap together, the arms extending outwardly from the housing a sufficient distance to be grasped for threading the housing into a water supply conduit.

BRIEF DESCRIPTION OF THE DRAWINGS

The present invention together with the above and other objects and advantages may best be understood from the following detailed description of the embodiment of the invention illustrated in the drawings, wherein:

FIG. 1 is a side elevational view of a poultry watering valve constructed in accordance with the present invention;

FIG. 2 is an enlarged sectional view taken along the line 2—2 of FIG. 1;

FIG. 3 is a view similar to FIG. 2 showing the poultry watering valve in the open position;

FIG. 4 is an enlarged sectional view taken along the line 4—4 of FIG. 2;

FIG. 5 is a side elevational view of a poultry watering valve that is an alternative embodiment of the present invention;

FIG. 6 is an end view of the valve of FIG. 5 taken from the line 6—6 of FIG. 5;

FIG. 7 is an enlarged sectional view of the valve taken along the line 7—7 of FIG. 6; and FIG. 8 is a sectional view taken along the line 8—8 of FIG. 7 and illustrating the valve in the open position.

DETAILED DESCRIPTION OF THE PREFERRED EMBODIMENT

Referring now to the drawings, and initially to FIGS. 1-4, there is illustrated a poultry watering valve designated as a whole by the reference character 10 and constructed in accordance with the principles of the present invention. Valve 10 includes a housing generally designated as 12 and operates on demand to regulate the flow of drinking water from an inlet port 14 to an outlet port 16. Housing 12 includes a body 18 and cap 20 defining between them an internal cavity or chamber 22 containing a valve assembly generally designated as 24.

Preferably the body 18 and the cap 20 are molded of a strong and rigid plastic such as an acetal resin thermoplastic material. Inlet port 14 is defined in a generally tubular extension 26 of body 18. Extension 26 includes male threads 28 for securing the body 18 to female threads of a water supply conduit or fitting with inlet port 14 communicating with the water supply. A flange portion 30 of body 18 includes flats 32 engageable by a tool for threading extension 26 into position.

An internal wall 34 defined with body 18 separates inlet port 14 from the cavity 22. The downstream side of wall 34 defines an annular, axially oriented, smoothly curved valve seat 36. Valve seat 36 leads to and merges with an inlet passage or bore 38 extending upstream from the valve seat 36 toward the inlet port 14. An annular shoulder 40 surrounds and is spaced somewhat downstream from the valve seat 36. Three vent grooves 42 extend radially in the shoulder 40. Shoulder 40 is located at the upstream end of the cavity 22.

Cap 20 includes female threads 44 formed on the inner surface of a skirt portion 46 mating with male threads 48 defined on a collar portion 50 of the body 18. Outlet port 16 is defined in a collar portion 52 at the downstream end of cap 20. Spaced ribs 54 between skirt portion 46 and collar portion 52 make it easy to grasp the cap 20 to thread it onto or off of body 18. In the illustrated fully assembled position, the end of skirt portion 46 bottoms on flange 30. Threads 44 and 48 are designed to turn at a substantially lower torque than the threads 28 so that the cap 20 can be removed from body 18 without removing body 18 from the water supply conduit.

Valve assembly 24 includes a seal member 56, a biasing spring 58 and an operating stem 60. Seal member 56 is a one piece, unitary body formed as by molding from a homogeneous elastomeric material such as ethylene propylene rubber or a blend of ethylene propylene rubber and polypropylene resin. This material is chosen to have a degree of flexibility and resilience generally in the nature of a slightly soft rubber. Preferably the material has a hardness in the approximate range of eighty to ninety durometer.

Seal member 56 is generally symmetrical about its axis and is generally coaxial with the housing 12 and valve seat 36. It includes a flange portion 62 having an upstream abutment surface 64. A shank portion 66 extends downstream from the flange portion 62. Operating stem 60 is a hollow tubular metal body having a central recess 68 with an open end surrounded by a flange 70. Shank 66 of seal member 56 is received within recess 68, and retention ribs 72 on the shank 66 provide a relatively light frictional retention sufficient to hold the seal 56 and stem 60 in assembly, but permitting them to be pulled apart for replacement of the seal member 56 if desired. Ribs 72 also provide venting of recess 68. An outer end portion 74 of stem 60 is closed by an end wall 76.

Biasing spring 58 is captured in compression between the stem flange 70 and a spring seat defined around an internal hub portion 78 at the inner end of collar portion 52 within cavity 22. Spring 58 is generally conical in shape and serves both to center the valve assembly 24 and to urge it toward the closed position illustrated in FIG. 2.

In this closed position, the abutment surface 64 of the seal member 56 engages the shoulder 40 of the body 18.

A valving extension 80 of seal member 56 extends in the upstream direction from the central region of the abutment surface 64. The extension 80 includes a valve member portion 82 engageable with the valve seat 36 when the valve 10 is closed, and further includes a restrictor pin portion 84 normally received in the inlet bore 38.

The soft nature of the material of which seal member 56 is made permits the valve member portion 82 to conform to and tightly seal against the valve seat 36 due to the closing force provided by the spring 58. Excessive deformation of the seal member 56 at the valve seat interface is prevented by the abutment surface 64 and the shoulder 40. In the closed position, much of the spring force is bypassed by abutment surface 64 directly to the housing 12, and the remaining force component is sufficient to reliably close the valve without excessive deformation of the soft valve member 82.

Restrictor pin 84 fits within the inlet bore 38 with a restricted clearance providing a regulated maximum vents excessive flow in a full open position even at relatively high inlet pressures and contributes to the uniform operation of the valve over a wide range of inlet pressures. The restricted and regulated flow characteristics of the valve 10 permit it to be used not only in cup systems but also in nipple systems at relatively high pressures such as four to ten pounds per inch. Operation of a system at this level of results in uniform operation of valves located throughout the system.

End portion 74 of stem 60 extends through the outlet port 16 and is accessible for contact by a drinking bird. Opening of the valve on demand is accomplished by pivoting or tilting the valve assembly 24 as illustrated in FIG. 3. The internal wall defining outlet port 16 is conical and is angled to correspond with the valve stem tilting motion to provide a stop at the illustrated full open position.

As can be seen by comparing FIGS. 2 and 3, the restrictor pin 84 flexes within the inlet bore 38 as the valve 10 opens and closes. The outer periphery of the abutment surface 64 on flange 62 provides a pivot point or fulcrum for tilting valve movement. Consequently, as the valve is tilted toward the open position, the valve member 82 tilts away from the valve seat 36 to permit flow through the valve. At the same time, the fact that the fulcrum point is radially spaced away from the valve member 82 and valve seat 36 causes a limited axial lifting of the valve member 82 in the axial direction away from the valve seat. Coincident with this movement, a limited axial stroking motion occurs as the restrictor pin 84 moves within the inlet bore 38. This provides a continuing self-cleaning action as the valve is used.

The action of the valve 10 is progressive in that the amount of flow permitted through the valve varies in a predictable and uniform way as the valve is operated from the closed to the open position. This regulated flow characteristic prevents splashing or spilling and makes the valve easy to learn and operate by a bird. The operating characteristics of the valve are substantially independent of inlet pressure variations over a wide range. As a result, the valve 10 can be used both as a supply valve in a cup system and as a nipple valve in an overhead nipple system. An advantage is that a bird trained on one type of system readily adapts to operation of the same valve in a different type of system.

Important advantages of the watering valve 10 relate to with cleaning of the valve. A substantial axial clearance is provided between the flange portion 62 of the seal member 56 and the hub 78 of the cap 20. As a result, the stem can be grasped to pull the stem and the seal member 56 in the downstream direction for a substantial distance. This permits the valve to be cleaned by a flushing operation as the restrictor pin 84 is pulled entirely out of the inlet bore 38. In addition, the cap 20 may be removed from the body 18 without tools while the threads 28 remain in engagement with a supply conduit. This permits the valve 10 to easily be disassembled for repair or replacement of parts if necessary. Spring 58 is disposed in a generally conical plane within the cavity 22 in the flow path between the valve seat 36 and the outlet port 16. The spring diffuses high velocity water within cavity 22 to eliminate jetting or turbulence in the flow from the outlet portion 16. As a result, splash and waste of water is avoided.

Turning now to FIGS. 5-8, there is illustrated a poultry watering valve 90 that is an alternative embodiment of the present invention. In most respects, the components of the valve 90 are identical to the components of the valve 10 described above. Identical components are provided with the same reference numbers and are not described again. In accordance with the invention, the valve 90 includes a snap fit assembly generally designated as 92 for attaching cap 20 to body 18 and for permitting mounting of the valve 90 to a supply conduit without the use of tools.

More specifically, in place of the flange 30 and wrenching flats 32 of valve 10, the valve 90 includes a body 94 having a pair of diametrically opposed resilient snap arms 96 releasably engageable with a frictional snap action with a pair of detent flanges 98 formed on a cap 100. Skirt 102 of cap 100 telescopes over collar 104 of body 94 and seats against a shoulder 106 on the body 94. To hold the cap 100 and body 94 in assembly, the cap is placed over the body and rotated until projections 108 at the ends of arm 96 snap into recesses 110 of detent flanges 98.

Arms 96 include first portions 112 extending radially outwardly from the body 94. Intermediate portions 114 curve through approximately 180 degrees and join with radially inwardly extending portions 116 carrying the latch detents 108. Arms 96 extend outwardly for a sufficient distance that the arms 96 function like the wings of a wing nut and permit the valve 90 to be installed without tools using thumb and forefinger.

The two functions of the arms 96 are made possible by the configuration of the arms. Each arm is of a relatively uniform cross section throughout most of its length and includes a relatively larger dimension 118 (FIG. 6) and a relatively smaller dimension 120 (FIG. 5). The substantial length of the arms, including curved intermediate portions 114, in combination with the orientation of the smaller cross sectional dimension provides the flexibility needed for the snap acting detent characteristic. Conversely, the relatively large cross sectional dimension seen in FIG. 6 provides substantial strength and rigidity in the plane normal to the valve axis for tightening of the threads 28 when the valve is installed.

While the invention has been described with reference to details of the illustrated embodiment, these details are not intended to limit the scope of the invention as defined in the appended claims.

I claim:

1. A poultry watering valve comprising:

a housing including an inlet, an outlet and a flow path extending between said inlet and said outlet;

a valve seat surrounding said flow path;

an inlet bore extending upstream from said valve seat toward said inlet;

a valve member engageable with said valve seat to control flow in said flow path;

biasing means operatively engaged with said valve member for urging said valve member toward a closed position in engagement with said valve seat; and a valve stem operatively engaged with said valve member for moving said valve member away from said valve seat to an open position;

the poultry watering valve being characterized by:

an elastomeric seal member captured in said housing between said valve seat and said outlet;

said valve member being defined on said seal member; and said seal member including a restrictor pin portion extending upstream from said valve member through said inlet bore.

2. A poultry watering valve as claimed in claim 1, said seal member including a flange extending radially outward from said valve member, and said housing including a shoulder engaged by said flange in said closed position.

3. A poultry watering valve as claimed in claim 2, further comprising vent passage means between said flange and said shoulder.

4. A poultry watering valve as claimed in claim 3, said vent passage means comprising at least one groove in said shoulder.

5. A poultry watering valve as claimed in claim 2, said valve stem and said restrictor pin extending axially from said flange in opposed directions, and said valve stem extending beyond said outlet port for pivotal deflection from a normally centered position in order to move said valve member from the closed to the open position.

6. A poultry watering valve as claimed in claim 5, said seal member including a shank portion aligned with and opposed from said restrictor pin, and said stem comprising a tubular member telescoped over said shank portion.

7. A poultry watering valve as claimed in claim 6, said shank portion having rib means providing a friction slip fit within said stem.

8. A poultry watering valve as claimed in claim 1, said restrictor pin being flexible for permitting said valve member to tilt to said open position.

9. A poultry watering valve as claimed in claim 1, said seal member being molded of homogeneous plastic material of approximately 85 to 90 durometer hardness.

10. A poultry watering valve as claimed in claim 1, said biasing means comprising a spring held in compression against the upstream side of said seal member.

11. A poultry watering valve as claimed in claim 10, said spring permitting axial travel of said seal member away from said valve seat to permit said restrictor pin to move out of said inlet bore.

12. A poultry watering valve as claimed in claim 1, said housing including a valve body and a cap and means removably attaching said cap to said valve body.

13. A poultry watering valve as claimed in claim 12, said attaching means comprising threads.

14. A poultry watering valve as claimed in claim 12, said valve body including mounting threads adjacent said inlet port and said attaching means comprising flexible snap latch including a pair of opposed arms extending radially from said body.

15. A poultry watering valve comprising:
   a housing including a cavity, an annular valve seat at a first end of said cavity, an inlet port, an inlet bore extending from said valve seat toward said inlet port, and an outlet port at a second end of said cavity;
   a movable valve member in said cavity;
   spring means in said cavity biasing said valve member toward a closed position wherein said valve member is axially centered against said valve seat;
   a restrictor pin and an operating stem extending in opposite directions from said valve member;
   said restrictor pin normally extending into said inlet bore and said stem extending through and beyond said outlet port;
   said outlet port surrounding said stem with a radial clearance to permit angular deflection of said stem resulting in tilting of said valve member from said closed position to an open position in which part of said valve member is spaced from said valve seat; and
   said second end of said cavity being spaced from said valve member with an axial clearance to permit axial movement of said stem sufficient to move all of said valve member away from said valve seat and to move said restrictor pin out of said inlet bore for cleaning of the valve.

16. A poultry watering valve as claimed in claim 15, said restrictor pin being flexible.

17. A poultry watering valve as claimed in claim 16, said restrictor pin being integral and of one piece with said valve member.

18. A poultry watering valve as claimed in claim 15, further comprising a flange extending radially from said valve member within said cavity, said first end of said cavity including a shoulder engaged by said flange to provide a fulcrum during said tilting of said valve.

19. A poultry watering valve as claimed in claim 18, said flange engaging said shoulder in the closed position of said valve member for partially isolating said valve member from said spring means in said closed position.

20. A poultry watering valve for supplying water on demand from a conduit having a threaded opening, said poultry watering valve comprising:
   a valve body having a threaded inlet end engagable with the threaded conduit opening;
   a valve cap having an outlet end;
   a cavity defined between said body and said cap;
   a valve assembly captured in said cavity; and
   snap fit connection means defined on said body and cap for releasably holding said cap upon said body;
   the poultry watering valve being characterized by:
   said snap fit connection means comprising detent means defined on said cap; and
   a pair of flexible and resilient snap arms defined on said body and selectively engageable with said detent means;
   said arms being located at spaced regions around the periphery of said body and extending outwardly from said body a sufficient distance to be grasped for threading of said body inlet end.

21. A poultry watering valve as claimed in claim 20, each said snap arm extending radially away from said body for said sufficient distance and extending radially inwardly toward said cap and terminating in a free end engageable with said detent means.

22. A poultry watering valve as claimed in claim 21, said snap arms having relatively thicker and relatively thinner orthagonal dimensions in cross section, said relatively thinner dimension permitting flexing of said arms upon engagement with said detent means and said relatively thicker dimension stiffening said arms during said threading of said body inlet end.

* * * * *